US008359276B2

(12) United States Patent
Zhuang et al.

(10) Patent No.: US 8,359,276 B2
(45) Date of Patent: Jan. 22, 2013

(54) IDENTIFYING INFLUENTIAL PERSONS IN A SOCIAL NETWORK

(75) Inventors: Dong Zhuang, Beijing (CN); Benyu Zhang, Beijing (CN); Heng Zhang, Bellevue, WA (US); Jeremy Tantrum, Shoreline, WA (US); Teresa Mah, Bellevue, WA (US); Hua-Jun Zeng, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1708 days.

(21) Appl. No.: 11/533,742

(22) Filed: Sep. 20, 2006

(65) Prior Publication Data

US 2008/0070209 A1    Mar. 20, 2008

(51) Int. Cl.
*G06Q 99/00* (2006.01)
(52) U.S. Cl. ....................................................... 705/319
(58) Field of Classification Search .................. 705/319
See application file for complete search history.

(56) References Cited

U.S. PATENT DOCUMENTS

| | | | |
|---|---|---|---|
| 7,016,307 | B2 | 3/2006 | Vasudev et al. |
| 2002/0124053 | A1 | 9/2002 | Adams et al. |
| 2004/0088325 | A1 | 5/2004 | Elder et al. |
| 2004/0122803 | A1 | 6/2004 | Dom et al. |
| 2005/0075925 | A1 | 4/2005 | Sash |
| 2005/0096982 | A1 | 5/2005 | Morton et al. |
| 2005/0120084 | A1 | 6/2005 | Hu et al. |
| 2005/0154556 | A1 | 7/2005 | Keller et al. |
| 2005/0159970 | A1* | 7/2005 | Buyukkokten et al. ........... 705/1 |
| 2005/0203801 | A1 | 9/2005 | Morgenstern et al. |
| 2005/0235038 | A1 | 10/2005 | Donatella et al. |
| 2006/0015588 | A1 | 1/2006 | Achlioptas et al. |

(Continued)

FOREIGN PATENT DOCUMENTS

WO    WO-0101307 A2    1/2001

(Continued)

OTHER PUBLICATIONS

J. Shetty and J. Adibi. Discovering important nodes through graph entropy: the case of Enron email database. In ACM SIGKDD International Conference on Knowledge Discovery and Data Mining, Chicago, Ill, Aug. 2005.*

(Continued)

*Primary Examiner* — Jonathan Ouellette
*Assistant Examiner* — Maame Ofori-Awuah
(74) *Attorney, Agent, or Firm* — Lyon & Harr, L.L.P.; Craig S. Fischer

(57) ABSTRACT

An influential persons identification system and method for identifying a set of influential persons (or influencers) in a social network (such as an online social network). The influential persons set is generated such that by sending a message to the set the message will be propagated through the network at the greatest speed and coverage. A ranking of users is generated, and a pruning process is performed starting with the top-ranked user and working down the list. For each user on the list, the user is identified as an influencer and then the user and each of his friends are deleted from the social network users list. Next, the same process is performed for the second-ranked user, the third-ranked user, and so forth. The process terminates when the list of users of the social network is exhausted or the desired number of influencers on the influential person set is reached.

17 Claims, 4 Drawing Sheets

U.S. PATENT DOCUMENTS

| | | |
|---|---|---|
| 2006/0041543 A1 | 2/2006 | Achlioptas |
| 2006/0048059 A1 | 3/2006 | Etkin |
| 2006/0064431 A1 | 3/2006 | Kishore et al. |
| 2006/0080613 A1 | 4/2006 | Savant |
| 2006/0085419 A1 | 4/2006 | Rosen |
| 2006/0136498 A1 | 6/2006 | Insley |
| 2006/0143081 A1 | 6/2006 | Argaiz |
| 2006/0143183 A1 | 6/2006 | Goldberg et al. |
| 2006/0143236 A1 | 6/2006 | Wu |

FOREIGN PATENT DOCUMENTS

| | | |
|---|---|---|
| WO | WO-0173642 A1 | 10/2001 |
| WO | WO-0201405 A1 | 1/2002 |
| WO | WO-2006041425 A2 | 4/2006 |

OTHER PUBLICATIONS

Louise Clark. Network Mapping as a Diagnostic Tool (English translation). Centro Internacional de Agricultura Tropical, La Paz, Bolivia, 2006 (hereinafter "Clark").*

Heer Jeffrey. Vizster: Visualizing Online Social Networks. 2004 Retrieved from <http://hci.stanford.edu/jheer/projects/vizster/early_design/>.*

Akshay Java, Pranam Kolari, Tim Finin, and Tim Oates. Modeling the spread of influence on the blogosphere. In Proceedings of the 15th International World Wide Web Conference, 2006.*

Cadez, I.V., P. Smyth, and H. Mannila, Probabilistic modeling of transaction data with applications to profiling, visualization, and prediction, Proc. of the Seventh ACM Int'l Conf. on Knowledge Discovery and Data Mining (SIGKDD'01), 2001, pp. 37-46, San Francisco (CA), USA.

Domingos, P., Mining social networks for viral marketing, IEEE Intelligent Sys., 2005, vol. 20, No. 1, pp. 80-82.

Gradman, E., Distributed social software, Dec. 12, 2003, http://gradman.com/projects/dss/final/final.pdf.

Jordan, K., J. Hauser and S. Foster, The augmented social network, First Monday, Aug. 2003, vol. 8, No. 8, http://www.firstmonday.dk/issues/issue8_8/jordan/.

Liiv, I, Mining and Visualizing Power in Social Network Analysis. In Proceedings of the International Conference on Artificial Intelligence (ICAI'05), Las Vegas, Nevada, Jun. 27-30, 2005, pp. 754-759.

Liu, H., P. Maes, G. Davenport, Unraveling the taste fabric of social networks, Int'l J. on Semantic Web and Info. Sys., 2006, vol. 2, No. 1, pp. 42-71, Hershey, PA: Idea Academic Publishers.

Motani, M., V. Srinivasan, P. S. Nuggehalli, PeopleNet: engineering a wireless virtual social network, Proc. of the 11th Annual Int'l Conf. on Mobile Computing and Networking, 2005, pp. 243-257, Cologne, Germany.

Richardson, M., P. Domingos, Mining knowledge-sharing sites for viral marketing, Proc. 8th Int'l Conf. on Knowledge Discovery and Data Mining, 2002, pp. 61-70.

Zhang, J. and M. Van Alstyne, 2004, SWIM: Fostering social network based information search, CHI '04 Extended Abstracts on Human Factors in Computing Systems (CHI'04), 2004, Vienna, Austria.

Co-pending U.S. Appl. No. 11/555,279 Visualization application for mining of social networks, filed Nov. 1, 2006.

* cited by examiner

IDENTIFYING INFLUENTIAL PERSONS IN A SOCIAL NETWORK

BACKGROUND

Viral marketing (known as word-of-mouth advertising when the Internet is not involved) includes any marketing strategy that encourages individuals to pass on a marketing message to others using the social network of the Internet. This creates the potential for exponential growth of the marketing message, as an individual passes on the message to his friends, those friends pass it on to their friends, and so on. Viral marking, so called because it spreads similar to a virus epidemic, exploits pre-existing social networks to produce exponential increases in brand awareness. Viral marketing harnesses the network effect of the Internet.

Viral marketing is popular because such as marketing campaign is relatively easy to implement, has a relatively low cost, and yields a high and rapid response rate. Thus, the strength of viral marketing lies in its ability to obtain a large number of interested people at a low cost. Viral marketing is more powerful that traditional third-party advertising because it implies an endorsement from a friend or acquaintance.

One popular forum for viral marketing is online social networks. Online social networks are communities on the Internet where people can come together to exchange information, ideas, and opinions. These online social networks (such as MSN® Spaces) are rich with user-created text content, imported pictures, and music. Many online social networks are quite large in scale. For example, one online social network has more than 58 million users. These users interconnect with each other, which builds up a very rich and useful social network for each user. A user's social network is his compilation of online friends. This personal social network may contain hundreds or even thousands of other users, along with complex and often unique links between the user and a friend. For example, a link between the users and an online friend may range from a casual acquaintance to close family member. The link may not even be user initiated; it may simply be another user in the community viewing the user's blog.

One problem when implementing a viral marketing plan is finding a set of influential people from a group of people. More specifically, an advertiser may be unable to send its message to all members of an online social network. However, there are connections between these people. If one person sees the advertising, he may tell his friends. Thus, it is desirable for the advertiser to determine a select number of people in the social network who will maximize the number of people who ultimately receive the advertising message. The problem becomes how to best select these so called influential people (or influencers) in the social network.

One naive method is to select a certain number of people having the most friends. However, people selected by this method frequently are in the same social community and circle of friends and only cover a portion of the entire social network. Therefore, this method usually does not reach the maximum coverage. Another of finding influencers is to try all combinations of a certain number of people that will maximize the spreading of the advertising message. However, this requires an inordinate amount of computation time, and therefore is not a feasible alternative.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The influential persons identification system and method includes identifying a set of influential persons (or influencers) in a social network. The influential persons set of such that an advertiser can use the set to conduct a viral marketing campaign with maximum return at a minimal cost. Specifically, by sending the marketing message to those contained in the influential persons set, the advertiser achieves large coverage of the social network in a short amount of time.

In one embodiment, the social network is an online social network. The invention identifies this influential persons set so that it may be used by advertisers to maximize the targeting coverage of the social network. In other words, an influential persons set is generated such that by sending a message to the set the message will be propagated through the network at the greatest speed and coverage. The influential persons identification system and method uses a greedy strategy to generate the influential persons set. In other words, at each step, a person is selected as an influencer having a maximum number of friends that is not covered by previously selected users.

The influential persons identification system processes a list of users in a social network and, based upon links and interaction with other users on the network, identifies the top influencers on the network. The influential persons identification system includes a characteristics ranking module that ranking the network users based on a certain criteria. In one embodiment, the criteria is the number of friends a user has, whereby any type of direct connection between uses assumes that the two users are friends. In other embodiments, the criteria is a certain topic that the user may be interested in, as determined, for example, by the user's blog entries and chat sessions. In another embodiment, the ranking is performed by the interests and demographics of the users.

A ranking of users then is generated, and a pruning process is performed starting with the top-ranked user and working down the list. For each user on the list, the user is identified as an influencer and then the user and each of his friends are deleted from the list of social network users. Next, the same process is performed for the second-ranked user, the third-ranked user, and so forth. The process terminates when the list of users of the social network is exhausted or the desired number of influencers on the influential person set is reached.

The influential persons identification system and method also includes a user interface that displays the influential persons set to a system user. In addition, the user interface allows the system user to interact with the results. For example, in one embodiment, a two-dimensional (2-D) node-link graph is used to display the social network of the top-ranked influencers. A center node is used to represent the influencer user being examined, and lines are used to represent the links between the influencer and his friends. Various visualization features such as line thickness, line color, and text size are used enable the system user to easily identify the type of link between the influencer and his friends.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the influential persons identification system and method, reference is made to the accompanying drawings, which form a part thereof, and in which is shown by way of illustration a specific example whereby the influential persons identification system and method may be practiced. It is to be understood that other embodiments may be utilized and structural changes may be made without departing from the scope of the claimed subject matter.

I. System and Operational Overview

Figure 1:
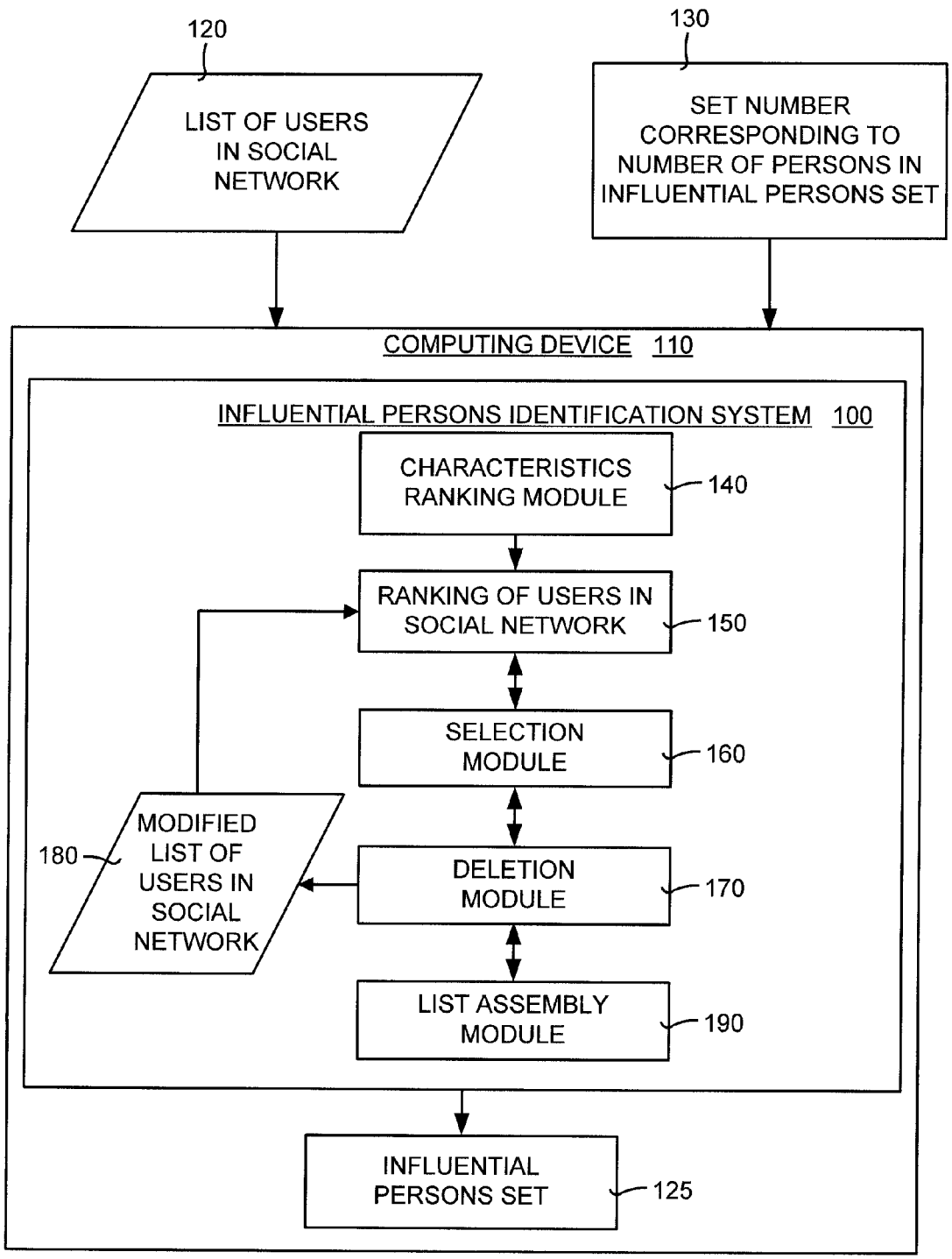
FIG. 1 is a block diagram illustrating an exemplary implementation of the influential persons identification system disclosed herein.

FIG. 1 is a block diagram illustrating an exemplary implementation of the influential persons identification system 100 disclosed herein. It should be noted that FIG. 1 is merely one of several ways in which the influential persons identification system 100 may be implemented and used. The influential persons identification system 100 may be implemented on various types of processing systems, such as on a central processing unit (CPU) or multi-core processing systems.

Referring to FIG. 1, the influential persons identification system 100 is designed to run on a computing device 110. It should be noted that the influential persons identification system 100 may be run on numerous types of general purpose or special purpose computing system environments or configurations, including personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computing device 110 shown in FIG. 1 is merely meant to represent any one of these and other types of computing system environments or configurations.

In general, the influential persons identification system 100 processes a list of users in a social network 120 and outputs an influential persons set 125. In particular, as shown in FIG. 1, input to the influential persons identification system 100 includes the list of users in a social network 120. Typically, the social network is an online social network community. By way of example, such an online social network community is MSN® Spaces. In one embodiment, the list of users in the social network is a list of all registered members of an online social network.

Input to the influential persons identification system 100 also includes a set number 130. This set number corresponds to the number of persons (or the size) of an influential persons set. In one embodiment, the set number is entered by a user of the influential persons identification system 100. In another embodiment, the set number may be selected by the influential persons identification system 100.

The influential persons identification system 100 includes a characteristics ranking module 140 for ranking users contained in the list of users in a social network 120. As explained in detail below, the ranking of users may be performed using several different criteria. The output is a ranking of the users in the social network 150. This ranking list 150 is processed by a selection module 160, and the first-ranked user on the ranking list 150 is selected for inclusion in the influential persons set 125.

Next, a deletion module 170 determines any friends of the first-ranked user in the social network. The deletion module 170 then modifies the list of users in a social network 120 by deleting the first-ranked user and his friends to obtain a modified list of users in the social network 180. Once again, this modified list does not contain the first-ranked user or his friends. This process is repeated by finding the second-ranked user in the social network, the third-ranked user, and so forth, until the set number 130 has been reached or there are no users left in the modified list of users in the social network 180. A list assembly module then assembles the users that have been identified as influencers in the manner just described. The output of the influential persons identification system 100 is the assembled list in the form of the influential persons set 125.

II. Operational Details

Figure 2:
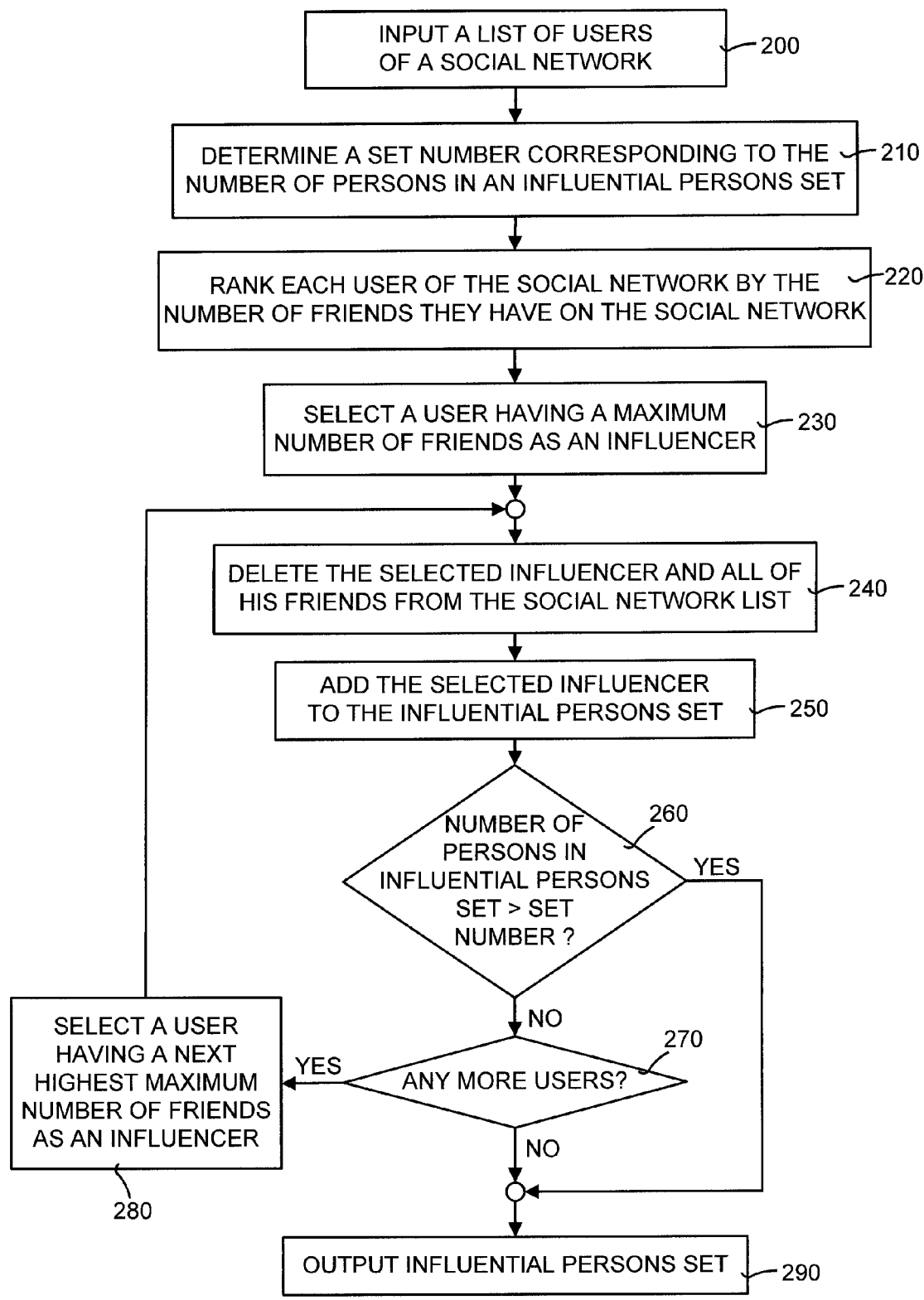
FIG. 2 is a flow diagram illustrating the detailed operation of the method used by the influential persons identification system shown in FIG. 1.

FIG. 2 is a flow diagram illustrating the detailed operation of the method used by the influential persons identification system 100 shown in FIG. 1. The influential persons identification method can be used to identify influencers in a social network. For advertisers, the principle for viral marketing includes finding an optimal set of people with high network value. High network value means that a user has the capability to spread the marketing message to the greatest number of people on the social network in the shortest amount of time.

The influential persons identification method selects M number of influencers from the users of a large-scale social network. As stated earlier, trying all possible combinations of M users is neither feasible nor practical. Instead, in one embodiment the influential persons identification method assumes that if user A is directly connected with user B in any way, then they are friends of each other. For instance, one example of being directly connected is where user A has user B listed as a friend on user B's space. In another embodiment, the influential persons identification method seeks to identify a set of influencers that maximizes coverage of the social network. In each embodiment and at each step of the method, the user is selected having the maximum number of friends that are not covered by previously selected influencers.

Referring to FIG. 2, the influential persons identification method begins by inputting a list of users of a social network (box 200). In other words, this list contains each of the users of the social network. In some embodiments, the social network is an online social network. In one embodiment, the list is a list of all registered users of the online social network. Next, a set number is determined (box 210). The set number corresponds to the number of persons that will be contained in an influential persons set. In one embodiment, this set number is determined by the user of the influential persons identification system 100. Alternatively, the set number is determined automatically by the system 100.

Each user in the list of users of the social network is ranked by a certain criteria (box 220). In one embodiment, the ranking is performed by determining the number of friends of each user. Thus, the user have the highest number of friends is selected as an influential person (or influencer) (box 230). In another embodiment, the influential persons identification method performs the ranking of users by examining a certain topic. This topic typically is entered by the user of the influential persons identification system. By way of example, if a system user (who may be an advertiser) is interested in marketing diapers, the users may be ranked according to whether they are parents and have young children or whether they have blogs or chat sessions discussing infant care. In yet other embodiments, the ranking of user may be performed by examining the characteristics of an individual. Since the interests and demographics of social network users typically are known, then users can be ranked according to their interests and demographics.

Next, the selected influencer and all of his friends are deleted from the list of users of the social network (box 240). This ensures that there will be maximum coverage of the social network with a minimum of overlap. The selected influencer then is added to the influential person set (box 250), for inclusion as an influencer on the social network.

A determination then is made whether the number of persons currently in the influential persons set is greater than the set number, M (box 260). If so, then the influential person set contains M number of influencers and the output is the influential persons set (box 290). If not, then another determination is made whether there are any more users remaining in the list of users of the social network (box 270). If there are users remaining, then a user is selected from the ranked list having the next highest ranking (box 280). If a ranked user has been deleted previously because she is a friend of a higher-ranked user, then the next remaining highest ranked user is considered. The process then begins again with that next highest ranked user being classified as an influencer and that user and her friends being deleted from the list of users of the social network. If the determination is made that there are no user left in the list of users of the social network, then the output is the influential persons set (box 290).

Figure 3:
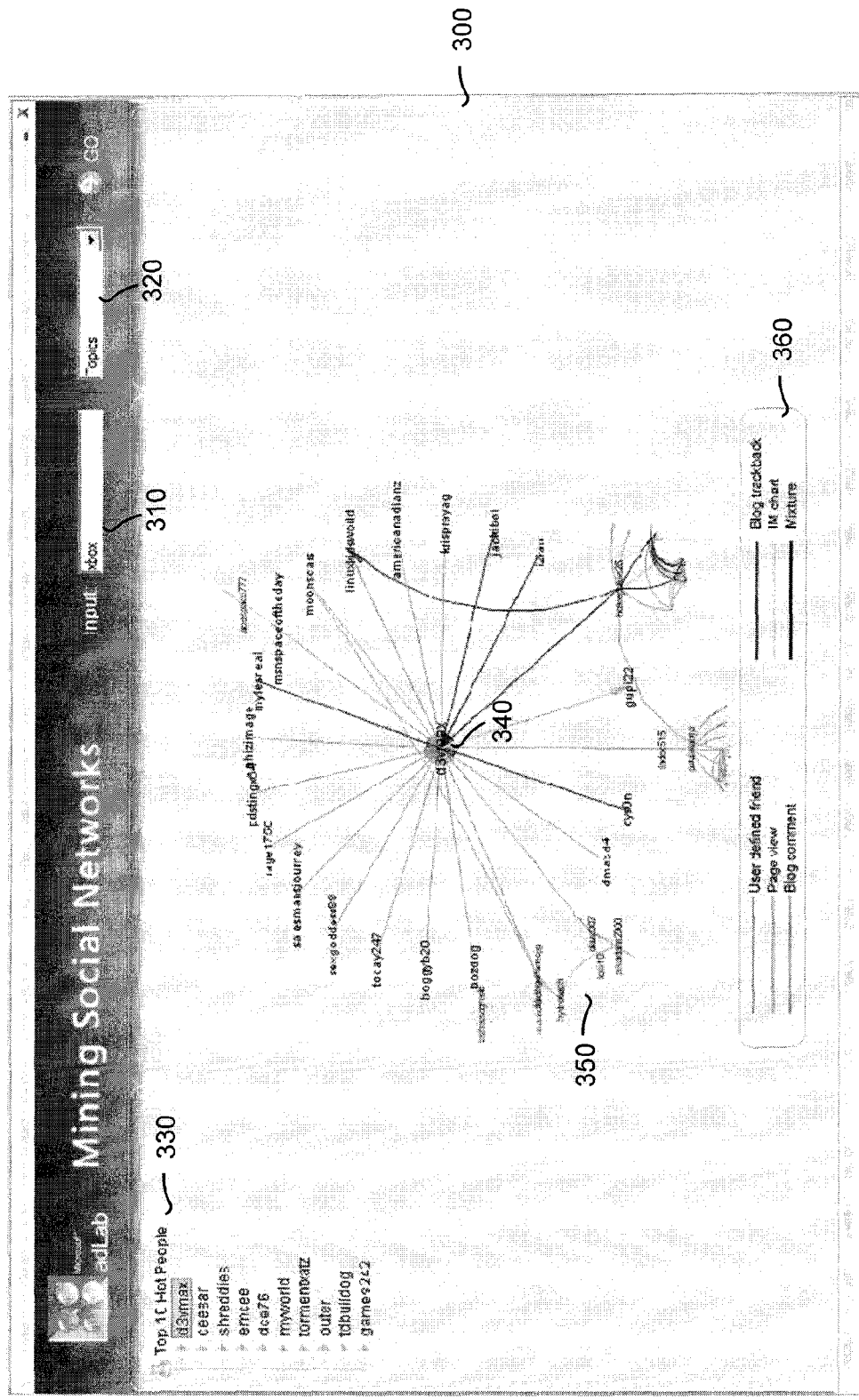
FIG. 3 is an exemplary embodiment of a user interface of the influential persons identification system and method shown in FIGS. 1 and 2.

FIG. 3 is an exemplary embodiment of a user interface of the influential persons identification system and method shown in FIGS. 1 and 2. In the example shown in FIG. 3, the system user is an advertiser who is trying to find users with an interest in the Microsoft® xBox gaming platform. The user interface 300 includes a first input box 310 whereby the system user has entered the topic "xbox". In addition, in a second input box 320 the system user has entered as the type of data the term "topics".

FIG. 3 illustrates what the influential persons identification method returns after processing. More specifically, a ranked, top ten list of "hot people" 330 displays to the system user the top ten users of the social network that are influential persons. In other words, these persons have the capability to spread the xBox advertising message to a large number of user on the network in a short amount of time.

In FIG. 3, a center node 340 shows the top-ranked user at the center of a node-link graph 350. The node-link graph shown in FIG. 3 is a hypergraph, which is an open source project. The system user can change which of the influencers is at the center node 340 by clicking on the desired user from the ranked list 330. In the embodiment shown in FIG. 3, the structure of a social network in two-dimensional (2-D) space. This 2-D node-link graph includes the ability to present the graph with various styles of lines.

Lines are used to represent links between the influencer at the center node 340 and his friends. In some embodiments, the lines are solid. In addition, a width of a line can be used to indicate the importance of the relationship between the influencer and his friends. By way of example, a thicker line could represent a stronger relationship between the two, while a thinner line could represent a weaker relationship, as compared to the thicker line.

Line color can also be used to represent various types of relationships between the influencer and his friends. In one embodiment, an orange line indicates a "user-defined friend", a green line indicates a "page view" (or someone who has visited the users blog or web page), a light blue line indicates a "blog comment" (or someone who has comment on the user's blog), a purple line indicates a "blog trackback", a yellow line indicates an "IM chat", and a dark blue line indicates a "mixture", meaning that there are no less than two kinds of the above types of relationships between users. This relationship is shown by the legend 260 on the user interface 300.

III. Exemplary Operating Environment

The influential persons identification system is designed to operate in a computing environment. The following discussion is intended to provide a brief, general description of a suitable computing environment in which the influential persons identification system may be implemented.

Figure 4:
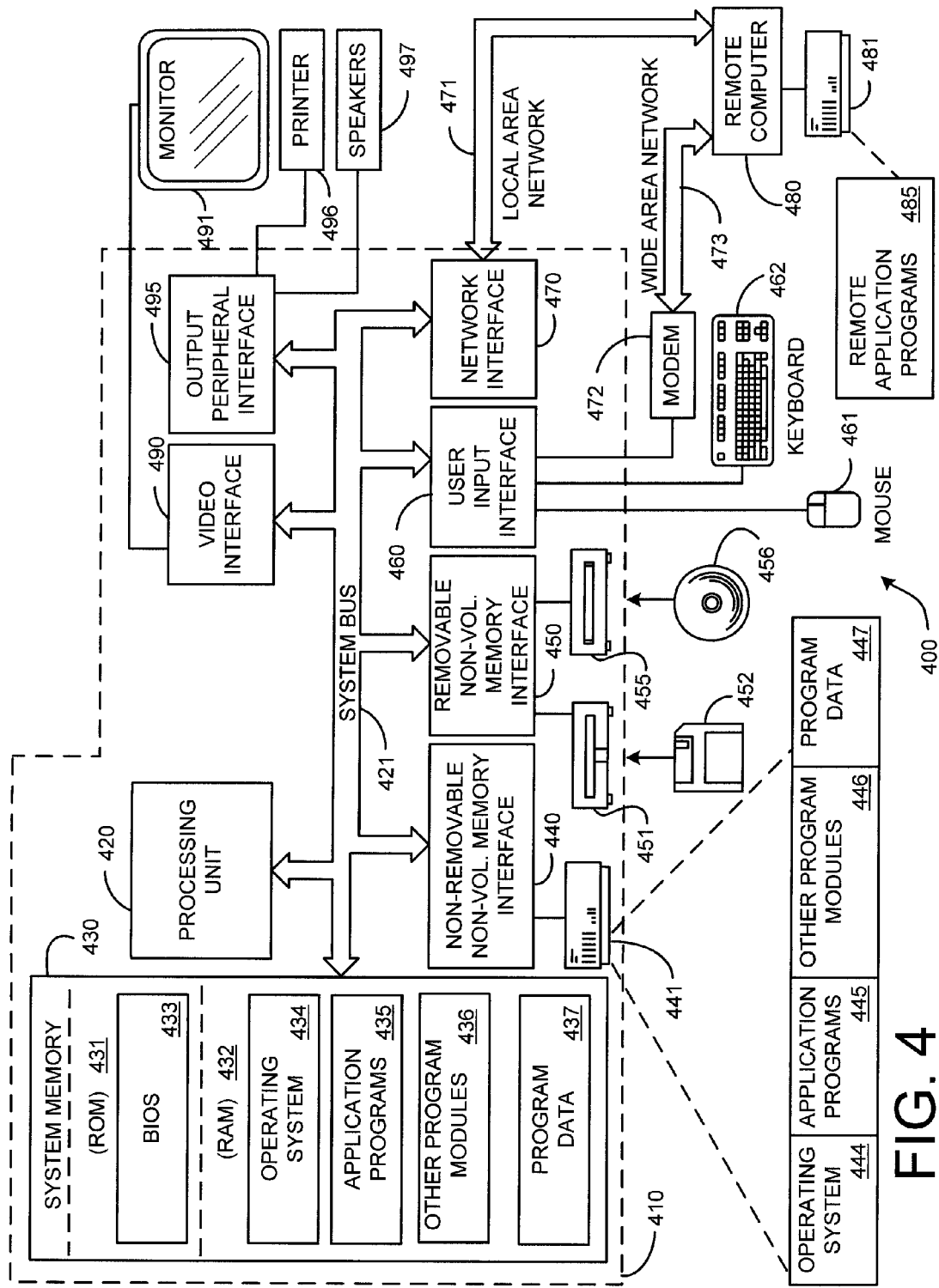
FIG. 4 illustrates an example of a suitable computing system environment in which the influential persons identification system shown in FIGS. 1-3 may be implemented.

FIG. 4 illustrates an example of a suitable computing system environment in which the influential persons identification system shown in FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment.

The influential persons identification system is operational with numerous other general purpose or special purpose computing system environments or configurations. Examples of well known computing systems, environments, and/or configurations that may be suitable for use with the influential persons identification system include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The influential persons identification system may be described in the general context of computer-executable instructions, such as program modules, being executed by a computer. Generally, program modules include routines, programs, objects, components, data structures, etc., that perform particular tasks or implement particular abstract data types. The influential persons identification system may also be practiced in distributed computing environments where tasks are performed by remote processing devices that are linked through a communications network. In a distributed computing environment, program modules may be located in both local and remote computer storage media including memory storage devices. With reference to FIG. 4, an exemplary system for the influential persons identification system includes a general-purpose computing device in the form of a computer 410.

Components of the computer 410 may include, but are not limited to, a processing unit 420 (such as a central processing unit, CPU), a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer readable media. Computer readable media can be any available media that can be accessed by the computer 410 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 410. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 840 includes computer storage media in the form of volatile and/or nonvolatile memory such as read only memory (ROM) 431 and random access memory (RAM) 432. A basic input/output system 433 (BIOS), containing the basic routines that help to transfer information between elements within the computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 420 through a user input interface 460 that is coupled to the system bus 421, but may be connected by other interface and bus structures, such as, for example, a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for identifying a set of influential persons in a social network, comprising:
    using a general-purpose computing device to perform the following:
        ranking a list of users in the social network based on a number of friends they have on the social network;
        selecting as a first-ranked user a user having a largest number of friends:
        designating the first-ranked user as an influencer to include in the set of influential persons before deleting any users from the list of users in the social network;
        deleting the first-ranked user and friends of the first-ranked user from the list of users in the social network;
        determining that a ranked user has been deleted because that ranked user is a friend of the first-ranked user;
        designating a next remaining highest ranked user as the next first-ranked user;
        designating the next first-ranked user as an influencer to include in the set of influential persons before deleting any users from the list of users in the social network; and
        repeating the above process for subsequent-ranked users to generate the set of influential persons.

2. The method of claim 1, wherein the social network is an online social network.

3. The method of claim 1, further comprising determining a set number corresponding to a number of users in the influential persons set.

4. The method of claim 3, further comprising causing the set number to be determined by a system user.

5. The method of claim 1, further comprising determining that two users are friends if they have a direct connection between them.

6. The method of claim 1, further comprising repeating the above process for subsequent-ranked users to generate the set of influential persons until a number of users in the influential persons set is greater than the set number.

7. The method of claim 6, further comprising repeating the above process for subsequent-ranked users to generate the set of influential persons until there are no more users left in the list of user the social network.

8. The method of claim 7, further comprising displaying the influential persons set to a system user through a graphical user interface in the form of a two-dimensional (2-D) node-link graph.

9. The method of claim 8, further comprising:
    displaying the first-ranked user as a center node in the graph; and
    displaying links between the first-ranked user and his friends as lines in a radial fashion emanating from the center node.

10. The method of claim 9, further comprising using a width of the line to indicate a strength and importance of a relationship between the first-ranked user and his friends, such that a thicker line represents a stronger relationship between the first-ranked user and his friends, while a thinner line represents a weaker relationship, as compared to the thicker line.

11. The method of claim 10, further comprising using line color to indicate a type of relationship between the first-ranked user and his friends.

12. A computer-readable storage medium having stored thereon computer-executable instructions for generating a set of influential persons in a social network, comprising:
    ranking a list of users in the social network based on a number of friends that each user has on the social network to generate a ranking list, such that a first user from the ranking list having a greater number of friends has a higher ranking and a second user from the ranking list having a fewer number of friends than the first user has a lower ranking that the first user;
    selecting a user from the ranking list having the highest ranking before deleting any users from the list of users in the social network;
    deleting the user having the highest ranking from the list of users in the social network;
    deleting friends of the user having the highest ranking from the list of users in the social network;
    adding the user having the highest ranking to the set of influential persons;
    determining that a ranked user has been deleted because that ranked user is a friend of the user having the highest ranking;
    designating a next remaining highest ranked user as the next user having the highest ranking;
    designating the next user having the highest-ranking as an influencer to include in the set of influential persons before deleting any users from the list of users in the social network: and
    repeating the above process for each subsequently-ranked user in the ranking list to generate the set of influential persons.

13. The computer-readable storage medium of claim 12, further comprising selecting a set number corresponding to a maximum number of persons contained in the set of influential persons.

14. A computer-implemented process for identifying and visualizing a set of influential persons in an online social network, comprising:
    using the computer to perform the following:
        ranking a list of users in the online social network based on a criteria to generate a ranking list;
        designating a first-ranked user as an influencer to include in the set of influential persons before deleting any users from the list of users in the social network, the influencer defined as having a high network value such that the influencer has the capability to spread a marketing message to a greatest number of people in the online social network in the shortest amount of time as compared to others in the online social network;
        generating the set of influential persons by deleting each user in the ranking list and the user's friends from the list of users in the online social network, beginning with a highest-ranked user on the ranking list and continuing in descending order until the set of influential persons is filled;
        determining that a ranked user has been deleted because that ranked user is a friend of the highest-ranked user;
        designating a next remaining highest ranked user as the next highest-ranked user;
        designating the next highest-ranked user as an influencer to include in the set of influential persons before deleting any users from the list of users in the social network: and
        displaying at least some persons in the set of influential persons to a viewer using a two-dimensional node-link graph that displays a desired person in the set of influential persons in a center of the node-link graph with lines connecting the desired person to other users in the social network of the desired person.

15. The computer-implemented process of claim 14, further comprising:

displaying the desired person as a center node in the center of the node-link graph; and using lines having different thickness to indicate an importance of a relationship between the desired person and the other users in the social network of the desired person, such that a thicker line represent a stronger relationship between the desired person and a user as compared to a thinner line, which represents a weaker relationship between the desired person and the user.

16. The computer-implemented process of claim 15, further comprising using lines having different colors to represent various types of relationships between the desired person and the other users in his social network.

17. The computer-implemented process of claim 16, further comprising using at least one of the following to indicate the various types of relationships:

(a) an orange line to indicate a user-defined friend, meaning that the desired person defined another user in his social network as a friend;

(b) a green line to indicate a page view, meaning that a user in the desired person's social network has visited a web page or a blog of the desired person;

(c) a light blue line to indicate a blog comment, meaning that a user in the desired person's social network has commented on the blog;

(d) a yellow line to indicate an instant messenger (IM) chat has occurred between the desired person and a user in his social network;

(e) a dark blue line to indicate that a mixture of no less than two types of relationships as indicated by (a) through (d) have occurred between the desired person and a user in his social network.

* * * * *